(12) United States Patent
Watts

(10) Patent No.: US 11,795,984 B2
(45) Date of Patent: Oct. 24, 2023

(54) METHOD FOR INSTALLING A DOOR HINGE FASTENER

(71) Applicant: Bruce Watts, Green Fork, IN (US)

(72) Inventor: Bruce Watts, Green Fork, IN (US)

(*) Notice: Subject to any disclaimer, the term of this patent is extended or adjusted under 35 U.S.C. 154(b) by 233 days.

(21) Appl. No.: 17/346,995

(22) Filed: Jun. 14, 2021

(65) Prior Publication Data

US 2021/0301852 A1 Sep. 30, 2021

Related U.S. Application Data

(60) Provisional application No. 63/056,594, filed on Jul. 25, 2020.

(51) Int. Cl.
*B23P 11/00* (2006.01)
*F16B 13/12* (2006.01)

(52) U.S. Cl.
CPC ............ *F16B 13/124* (2013.01); *B23P 11/00* (2013.01)

(58) Field of Classification Search
CPC ..................................................... B23P 11/00
See application file for complete search history.

(56) References Cited

U.S. PATENT DOCUMENTS

| | | | | |
|---|---|---|---|---|
| 4,881,296 A | * | 11/1989 | Marinoni | F16B 37/045 16/382 |
| 5,122,019 A | * | 6/1992 | Unger | F16B 5/02 411/340 |
| 5,653,074 A | * | 8/1997 | Yoon | E06B 3/984 49/504 |
| 9,133,630 B2 | * | 9/2015 | Dougherty | E04F 21/0007 |
| 2015/0368948 A1 | * | 12/2015 | Ward | F16B 33/00 411/366.1 |

* cited by examiner

*Primary Examiner* — Sarang Afzali
(74) *Attorney, Agent, or Firm* — Barry Choobin; Patent 360

(57) ABSTRACT

A fastener for securing a door hinge to a wooden jamb is provided. The fastener includes an anchor and a screw. The anchor has a wall formed by a plurality of splines enclosing a central inner void extending along the length of the anchor. The screw has a shaft extended between a tapered head and a tip and a threaded portion that extends along the length of the shaft. The anchor is inserted into a drilled hole in the wooden jamb. A door hinge is positioned on the wooden jamb and the screw is concentrically inserted into the central inner void of the anchor. The turning of the screw causes linear displacement of the tip of the anchor towards the tapered head of the screw causing expansion of the wall of the anchor against the wooden wall of the drilled hole and firmly holds the fastener secured in the hole.

3 Claims, 3 Drawing Sheets

METHOD FOR INSTALLING A DOOR HINGE FASTENER

CROSS-REFERENCE TO RELATED APPLICATIONS

This application claims priority to the U.S. provisional patent application Ser. No. 63/056,594, filed on Jul. 25, 2020, which is incorporated herein by reference in its entirety.

FIELD OF INVENTION

The present invention relates to a fastener, and more particularly the present invention relates to a fastener for securing a door hinge joint to a wooden jamb.

BACKGROUND

Doors are generally mounted to a wooden jamb through hinge joints. The hinge joints can be secured to the wooden jamb using threaded fasteners. A typical door hinge has 3-4 apertures into which the threaded fasteners can be screwed. The fasteners can be self-tapping screws having a tapered head. Known door hinge screws have a major drawback i.e., with time, the door hinge screws loosens. The door hinge screws incrementally wear out the surrounding area of the cavity in the wooden jamb in contact with the screw. Slowly the area of the cavity increases which can no longer hold the screw. The present solution is to replace the screw with a longer screw and/or a fatter screw. However, the longer screw also loosens up with time and there is a limit on screw length that can be inserted in the wooden jamb.

Therefore, a long-term and unsolved desire is there for a fastener that can overcome the aforesaid drawbacks of known door hinge screws.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a fastener for securing the door hinge joint to a wooden jamb.

It is another object of the present invention that the fastener is durable and does not loosen up.

It is still another object of the present invention that the fastener does not degrade the surface of the hole holding the fastener.

It is yet another object of the present invention that the fastener prevents the labor and cost of replacing the loosened door hinge screws.

In one aspect, disclosed is a fastener for securing a door hinge to a wooden jamb. The fastener includes an anchor and a screw. The anchor having a wall encasing a central inner void. The central inner void can extend along the length of the anchor. The screw having a head, a shaft, and a tip. The shaft extends between the tapered head and the tip and can have a threaded portion that extends along the length of the shaft. The screw can be configured to concentrically insert into the central inner void of the anchor causing expansion of the wall of the anchor. The tapered head of the screw can fit onto an aperture of the hinge joint. The top surface of the tapered head can have a grove for driving the screw using a screwdriver.

In one aspect, disclosed is a method for mounting a hinge joint to a wooden jamb, the method includes the step of drilling a hole in the wooden jamb. Upon making the hole, the anchor can be inserted into the hole, such as the anchor reaches the desired depth and the head of the anchor flush onto the wooden jamb. Thereafter, the hinge joint can be mounted onto the wooden jamb, such as an aperture of the hinge joint is concentric with the central inner void of the anchor. The screw can then be inserted through the aperture of the hinge joint into the central inner void of the anchor and fastened till the tapered head of the screw fits into the aperture of the hinge joint.

These and other objects and advantages of the embodiments herein and the summary will become readily apparent from the following detailed description taken in conjunction with the accompanying drawings

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
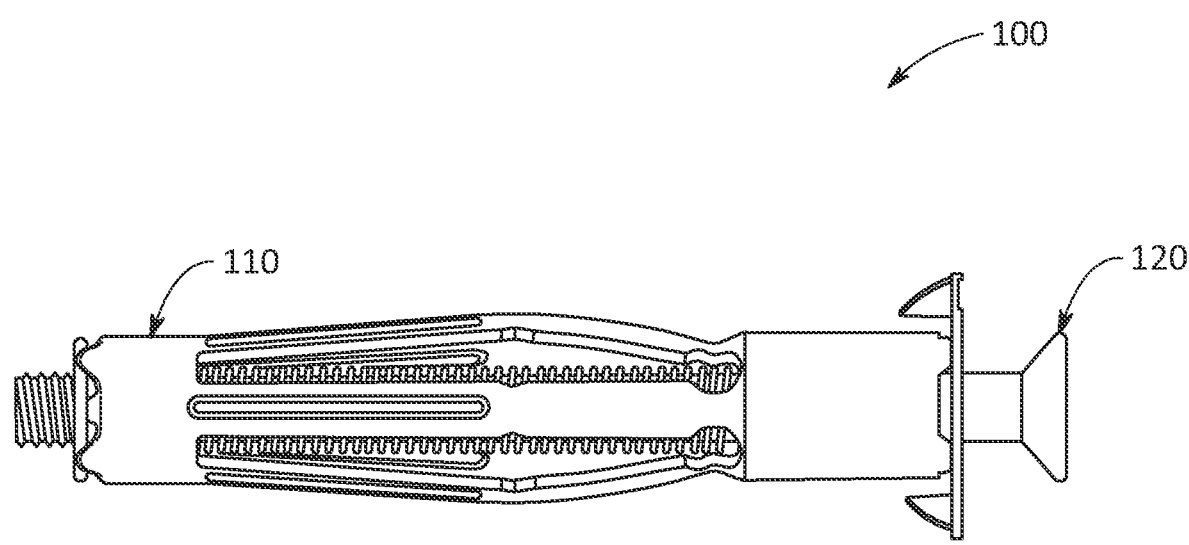
FIG. 1 shows the fastener, according to an exemplary embodiment of the present invention.
Figure 2:
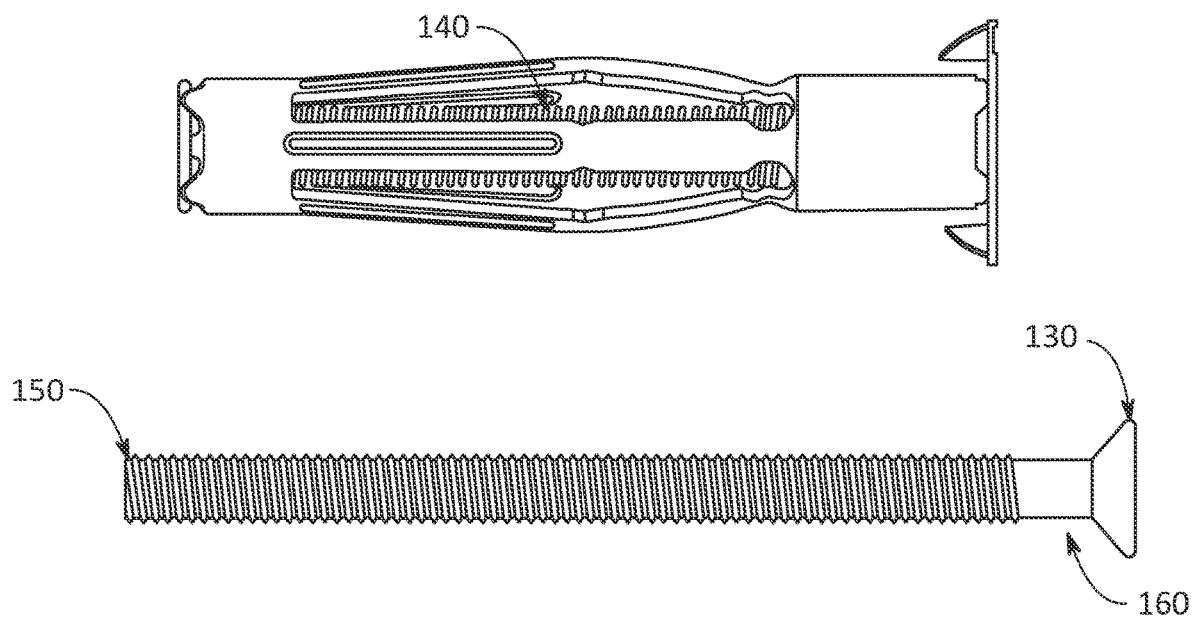
FIG. 2 is an exploded view of the fastener showing the anchor and the screw, according to an exemplary embodiment of the present invention.
Figure 3:
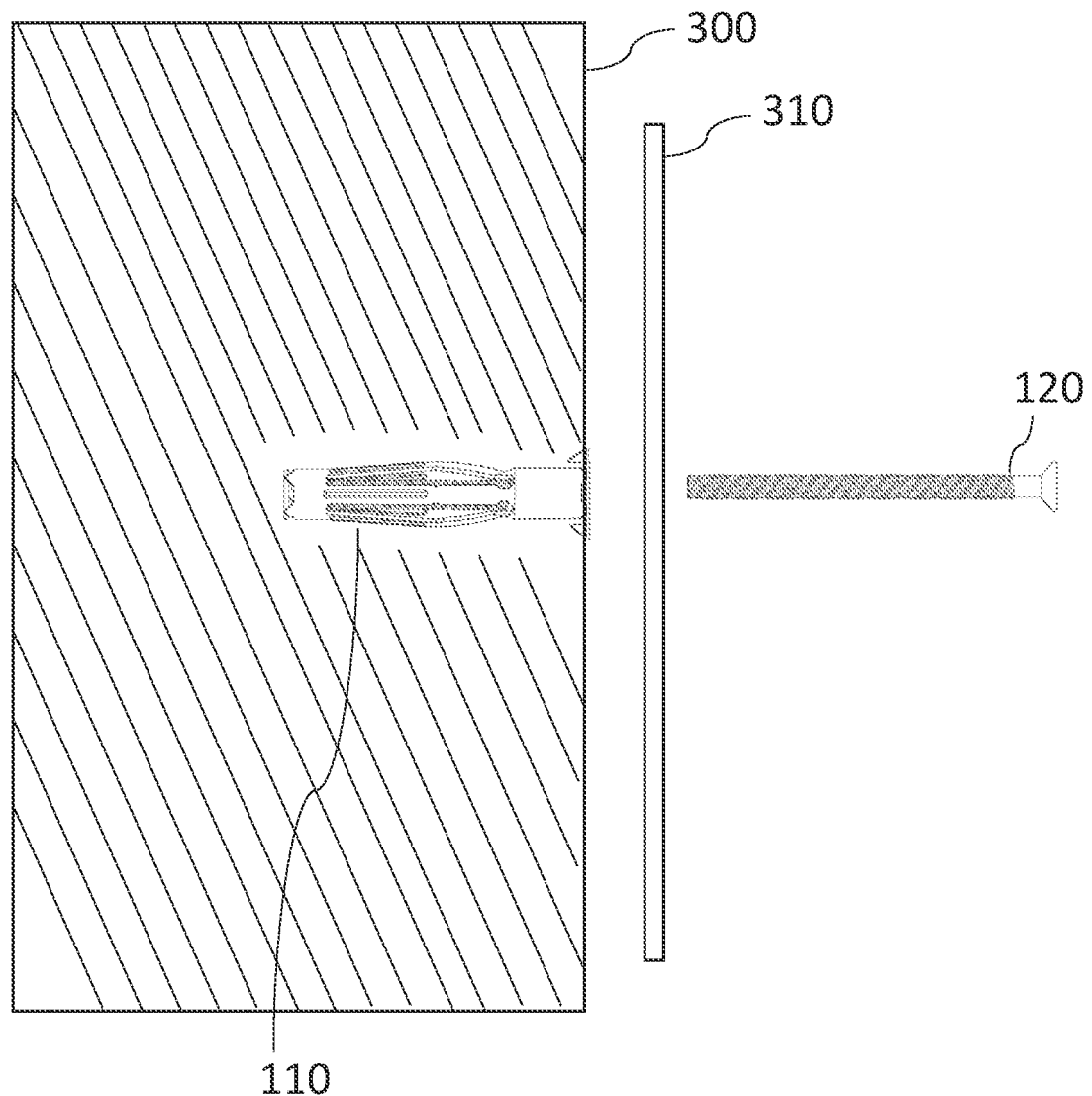
FIG. 3 illustrates installation of the hinge wherein an anchor 110 is inserted into a hole in the door jamb 300, also shown is a hinge 310, and a screw 120.

Referring to FIG. 1 which shows an exemplary embodiment of the fastener 100 for securing a door hinge to a wooden jamb. FIG. 2 shows an exploded view of the fastener 100 having an anchor 110 and a screw 120. The anchor 110 can have a head, a tip, and a wall extended between the head and the tip. The walls are expandable, such as when inserted into a drilled hole in the wood, the walls of the anchor can expand against the wood of the hole. The expansion of the wall of the anchor in the hole firmly holds the fastener secured in the hole. The outer surface of the anchor does not degrade the interior of the hole in contact with the anchor. The structure and functioning of the anchors for use in the drywall that can receive a screw are known to a skilled person, and all such anchors are within the scope of the present invention.

The anchor 110 includes a central inner void 160 encased by the wall and opens in the head of the anchor. The central inner void can extend along the length of the anchor. The central inner void can receive the screw causing the walls of the anchor to expand.

The screw 120 can include a tapered head 130, a shaft 140, and a tip 150. The shaft extends between the tapered head and the tip. The tapered head is critical for the screw to fit into an aperture of the door hinge. Screws having a flat head were found to be ineffective and the applicant discovered that the tapered head is a critical feature of the disclosed fasteners for securing the hinge joint to a wooden jamb. As can be seen in FIGS. 1 and 2, the tapered head narrows down from the flange of the head towards the shaft and the tapered head can fit in and onto the apertures of the hinge joint. The shaft can include a threaded portion extending along the length of the shaft. The tip of the screw can be flat or pointed depended upon the anchor. the screw upon fastening into the anchor causes the walls of the anchor to expand. The anchor shown in FIG. 2 has several splines forming the wall of the anchor. The tip of the anchor can have a threaded aperture that can threadedly mate with the threaded shaft of the screw. The longitudinal motion of the screw can be limited by the head of the anchor, while further tuning of the screw results in the transformation of the turning motion of the screw into linear motion of the tip of the anchor. The tip of the anchor can move towards the head of the anchor causing the walls of the anchor to expand.

To secure a door to the wooden jamb using a door hinge, the door hinge can first be mounted to the door. The wooden jamb can be prepared by drilling a hole. The width of the hole can be proportional to the width of the anchor. The anchor can then be inserted into the hole. A hammer can be used to fully insert the anchor into the hole, such as the head of the anchor flush to the wooden jamb. Thereafter, the door hinge can be positioned over the hole, such as the aperture of the door hinge can be concentric with the central inner void of the anchor. The screw can then be inserted into the anchor and fastened using a screw-driving tool, such as a screwdriver. The screw can be fastened till the tapered head of the screw rest in and onto the aperture of the door hinge.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for securing a door to a wooden jamb using a door hinge, the method comprising the steps of:
   providing a fastener, the fastener comprises:
      an anchor having a wall encasing a central inner void, wherein a plurality of splines forms the wall of the anchor, wherein the anchor has a flange along an opening of the central inner void, wherein the flange has a plurality of inward projecting pointed protrusions, and
      a screw having a tapered head, a tip, and a shaft, the shaft extends between the tapered head and the tip, the shaft includes a threaded portion along a length of the shaft, the screw upon fastening into the anchor causes the wall of the anchor to expand, wherein the anchor has a tip, the tip of the anchor has a threaded aperture configured to mate with the threaded portion of the screw;
   drilling a hole in the wooden jamb, wherein a width of the hole corresponds to a width of the anchor;
   upon drilling the hole, inserting the anchor into the hole;
   positioning the door hinge on the wooden jamb such that an aperture of the door hinge is concentric with the central inner void of the anchor;
   upon positioning the door hinge, inserting the screw into the central inner void of the anchor through the opening of the central inner void and through the aperture of the door hinge; and
   fastening the screw till the tapered head of the screw rests against the aperture of the door hinge, wherein turning motion of the screw is converted into a linear displacement of the tip of the anchor towards the tapered head of the screw causing expansion of the wall of the anchor against wooden wall of the drilled hole to firmly hold the fastener secured in the hole.

2. The method according to claim 1, wherein the tapered head of the screw is broad at top surface of the tapered head and narrows down towards the shaft.

3. The method according to claim 1, wherein the door hinge is coupled to the door.

\* \* \* \* \*